(12) United States Patent
Hirota

(10) Patent No.: US 6,599,566 B2
(45) Date of Patent: Jul. 29, 2003

(54) ORNAMENTAL PARTS AND MANUFACTURING METHOD THEREOF

(75) Inventor: Kashichi Hirota, Hachioji (JP)

(73) Assignee: Kyowa Electric and Chemical Co., Ltd., Tokyo (JP)

( * ) Notice: Subject to any disclaimer, the term of this patent is extended or adjusted under 35 U.S.C. 154(b) by 64 days.

(21) Appl. No.: 09/824,222

(22) Filed: Apr. 3, 2001

(65) Prior Publication Data

US 2001/0025852 A1 Oct. 4, 2001

(30) Foreign Application Priority Data

Apr. 4, 2000 (JP) .................................... 2000-101672
Feb. 19, 2001 (JP) .................................... 2001-041846

(51) Int. Cl.⁷ .............................. B05D 1/12; B05D 5/06
(52) U.S. Cl. ...................... 427/202; 427/203; 427/205; 427/470
(58) Field of Search ................. 427/470, 197, 427/199, 202–205; 428/206–208, 142–144; 312/204, 249.1

(56) References Cited

U.S. PATENT DOCUMENTS

| | | | | |
|---|---|---|---|---|
| 3,577,257 A | * | 5/1971 | Hutzler et al. |
| 3,666,521 A | * | 5/1972 | Weyna et al. |
| 3,749,629 A | * | 7/1973 | Andrews et al. |
| 5,114,789 A | * | 5/1992 | Reafler |
| 5,156,677 A | * | 10/1992 | Carpenter et al. |
| RE35,739 E | * | 2/1998 | Ellison et al. |
| 6,207,226 B1 | * | 3/2001 | Igarashi |

* cited by examiner

Primary Examiner—Fred J. Parker
(74) Attorney, Agent, or Firm—Jacobson Holman PLLC

(57) ABSTRACT

A method for manufacturing an ornamental exterior panel having a lustrous appearance. The method including the steps of forming a part having front and rear faces with a transparent resin material, applying an adhesive on the rear face of the part, dispersedly applying colored or lustrous fine particles onto the adhesive, and coating with a selected color tone of paint over the resulting rear face of the part.

4 Claims, 9 Drawing Sheets

ORNAMENTAL PARTS AND MANUFACTURING METHOD THEREOF

FIELD OF THE INVENTION

The present invention relates to an ornamental part and a manufacturing method thereof More specifically, the present invention relates, but is not limited, to an exterior panel for apparatuses, such as televisions and personal computers, and to an ornamental exterior panel suitable for an exterior panel of a telephone, such as portable phones, and a manufacturing method thereof.

BACKGROUND OF THE INVENTION

It has been variously attempted to improve the appearance of the display frames used in televisions and personal computers, by finishing them in lustrous form. However, in the present circumstances, it is difficult to obtain a lustrous product through one-time coating or painting. For this reason, it is generally practiced to coat with a transparent, lustrous paint over the initial painting. Such lustrous coating finish is expensive and thus difficult to be employed for applications with the indispensable requirement of low-cost.

SUMMARY OF THE INVENTION

In view of the aforementioned circumstance, it is an object of the present invention to provide a method capable of manufacturing an ornamental exterior panel with a lustrous appearance in low-cost and to provide an ornamental panel manufactured by this method.

In order to achieve the aforementioned object, in one aspect of the present invention, there is provided a manufacturing method comprising the steps of forming a part having front and rear faces with a transparent plastic or resin material, applying an adhesive on the rear face of the part, dispersedly applying colored or lustrous fine particles onto the adhesive, and coating with a paint having a selected color tone over the resulting rear face of the part.

According to another aspect of the present invention, there is provided a method for manufacturing an ornamental part, comprising the steps of forming a part having front and rear faces with a transparent plastic or resin material, coating the rear face of the part with a transparent paint having colored or lustrous fine particles mixed therewith, and coating with a desired color of paint over the resulting coated layer.

According to still another aspect of the present invention, there is provided a method for manufacturing an ornamental part, comprising the steps of forming a part having front and rear faces with a resin material, coating with a paint having a desired color tone over the front face of the part, dispersedly applying colored or lustrous fine particles onto the coated layer before this coated layer dries up, and coating with a transparent paint over the resulting coated layer. rear face of the outer body, a number of colored or lustrous fine particles which are dispersedly distributed over the adhesive layer, and a coated layer formed on the resulting rear face of the adhesive layer, whereby the front side of the panel has a lustrous yielded by the transparent plastic material comprising the outer body and an ornamental appearance yielded by the dispersedly distributed fine particles and the coated layer formed on the resulting rear face of the adhesive layer. This panel may also comprise an outer body which is formed of a transparent plastic or resin material and the front face of which is exposed outside of the panel, an intermediate coated layer formed on the rear face of the outer body, and a coated layer formed on the rear face of the intermediate coated layer, wherein the intermediate coated layer is formed of a transparent paint having colored or lustrous fine particles mixed therewith. In this case, the front side of the panel may also have a lustrous yielded by the transparent plastic material comprising the outer body, and an ornamental appearance yielded by the fine particles dispersedly distributed on the intermediate coated layer and the coated layer formed on the rear face of the intermediate coated layer. In other embodiment, the panel may comprise an outer body formed of a plastic or resin material, a coated layer having a desired color tone and formed on the outer layer, a number of colored or lustrous fine particles which are dispersedly distributed over the coated layer, and an overcoated layer coated with a transparent paint and formed on the coated layer and the fine particles, whereby the front side of the panel has a lustrous yielded by the overcoated layer and an ornamental appearance yielded by the dispersedly distributed fine particles and the coated layer having the desired color tone formed on the rear side of the dispersedly distributed fine particles.

In a front face of a television or other apparatus having a display screen, this panel may be configured as an ornamental frame for ornamentalizing around the television screen or display screen. This panel may also be configured as a panel comprising at least one of a side face and an upper face of the television or other apparatus having a display screen. Further, the panel of the present invention may be applied to telephones, such as portable phones. Furthermore, the panel of the present invention may be applied to any other ornamental parts, such as photo or picture frames. In the present invention, any suitable fine particles or fragments may be applicable, while a typical example includes fine particles or fragments of metallic foil or paper.

DESCRIPTION OF THE PREFERRED EMBODIMENT

Figure 1:
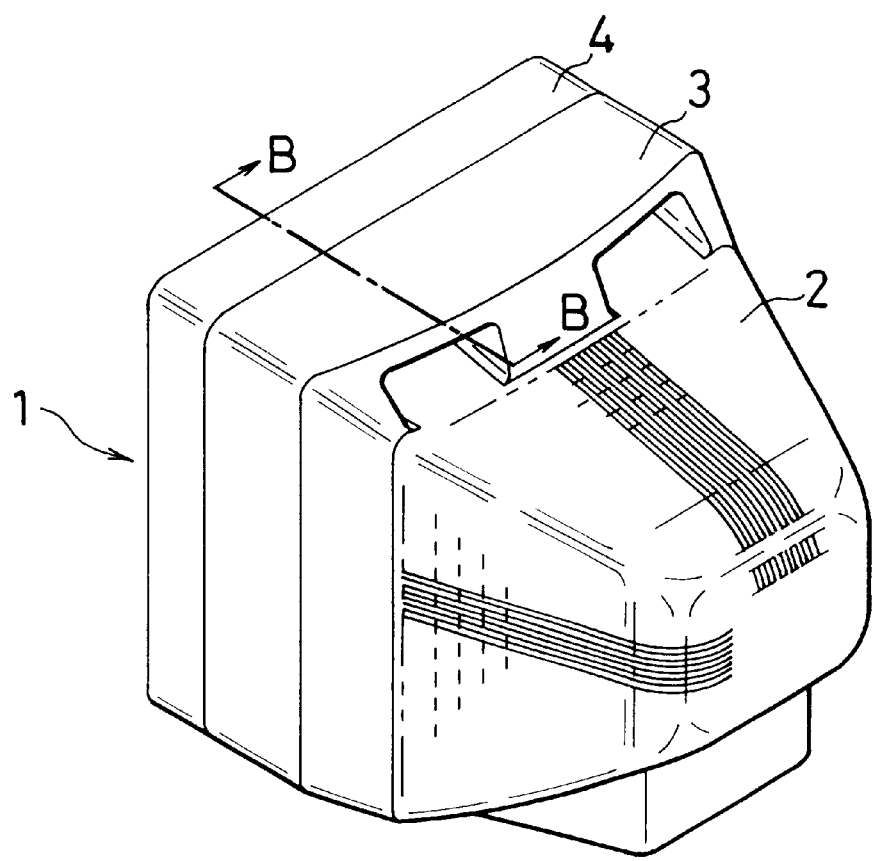
FIG. 1 is a rear perspective view showing one example of a personal computer cabinet implementing the present invention.
Figure 2:
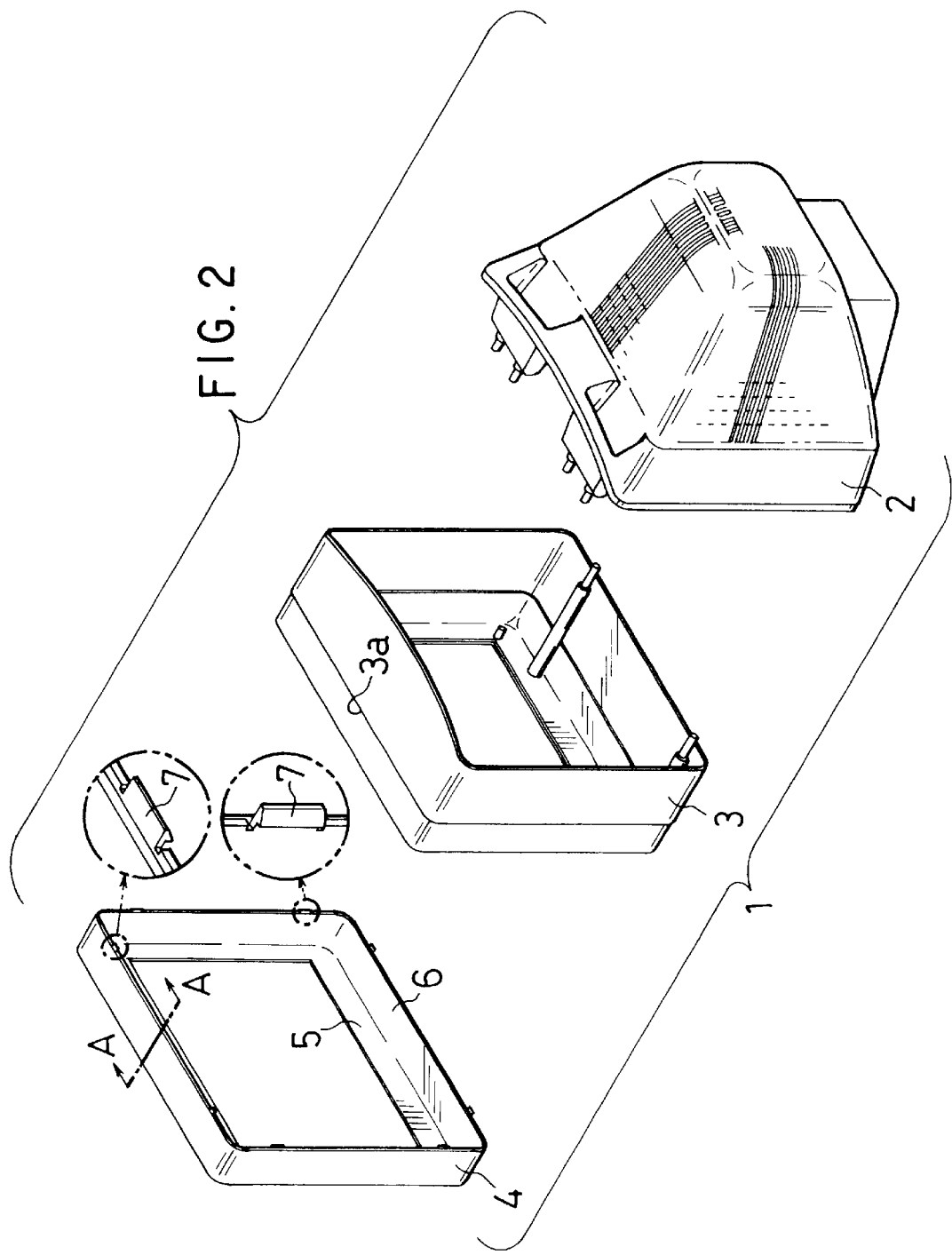
FIG. 2 is an exploded perspective view of the cabinet shown in FIG. 1.
Figure 3:
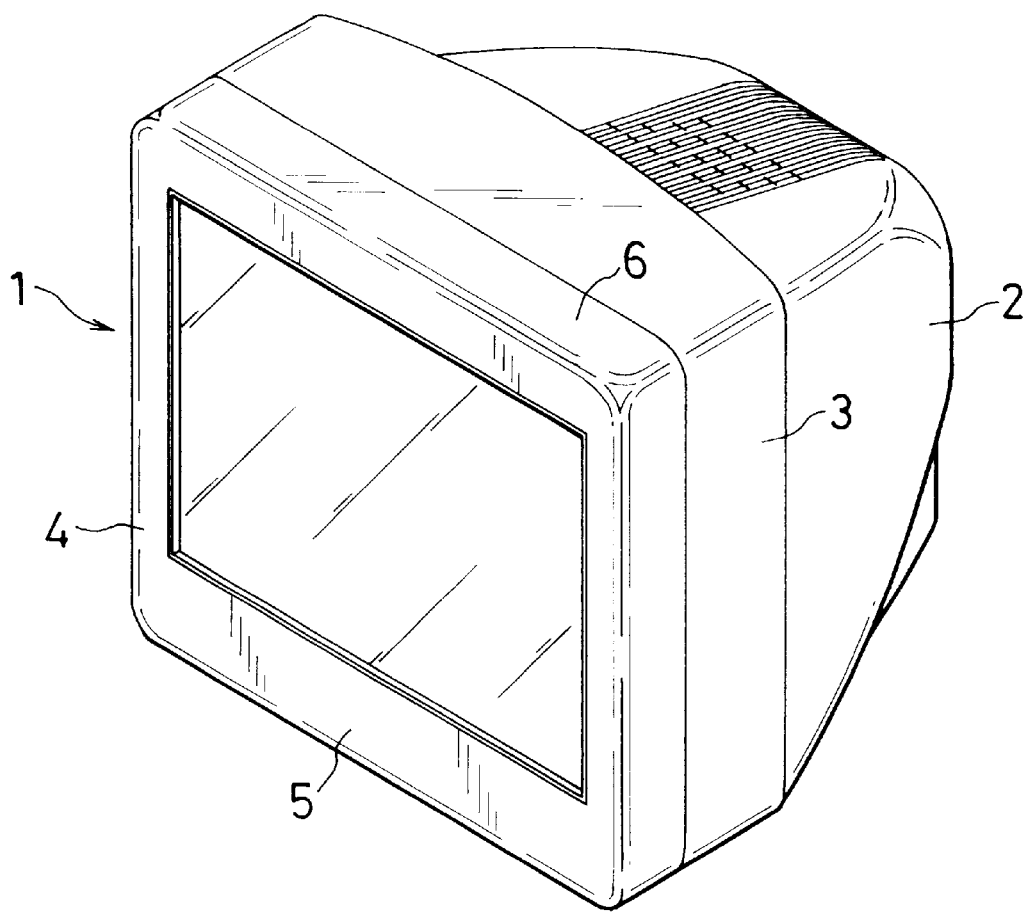
FIG. 3 is a front perspective view of the cabinet shown in FIG. 1.
Figure 4:
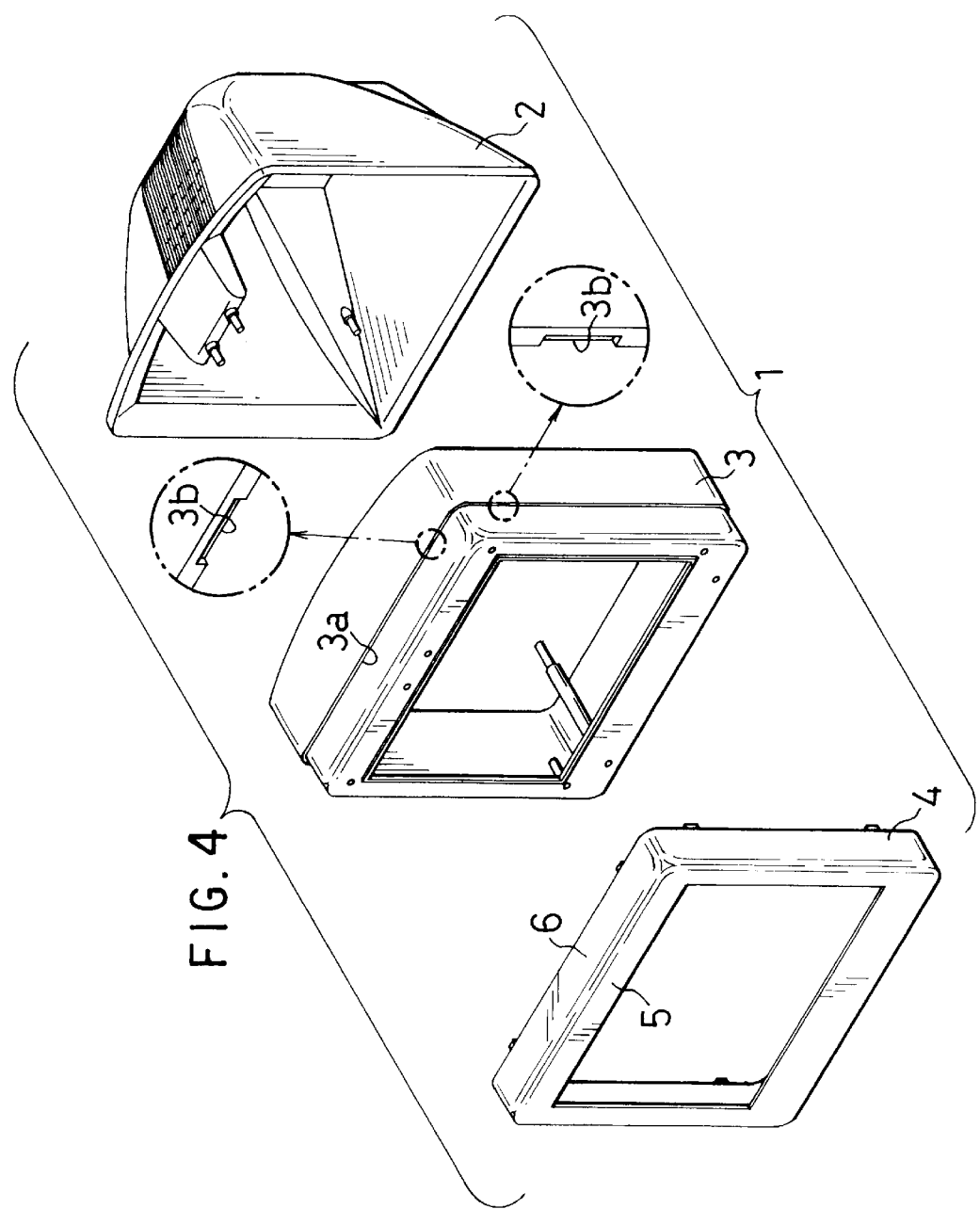
FIG. 4 is a front exploded perspective view of the cabinet shown in FIG. 1.

With reference to the drawings, embodiments of the present invention will now be described. FIG. 1 is a rear perspective view generally showing a cabinet 1 of a television or personal computer. As shown in the exploded view of FIG. 2, the cabinet 1 comprises a cabinet body 2, a mounting frame 3 attached to the front face of the cabinet body 2 by ordinary methods, and an ornamental frame 4 attached to the front face of the mounting frame 3. FIG. 3 and FIG. 4 are a front perspective and front exploded views of the cabinet 1, respectively. A CRT (not shown) is to be installed in the cabinet 1 by ordinary methods.

Figure 5:
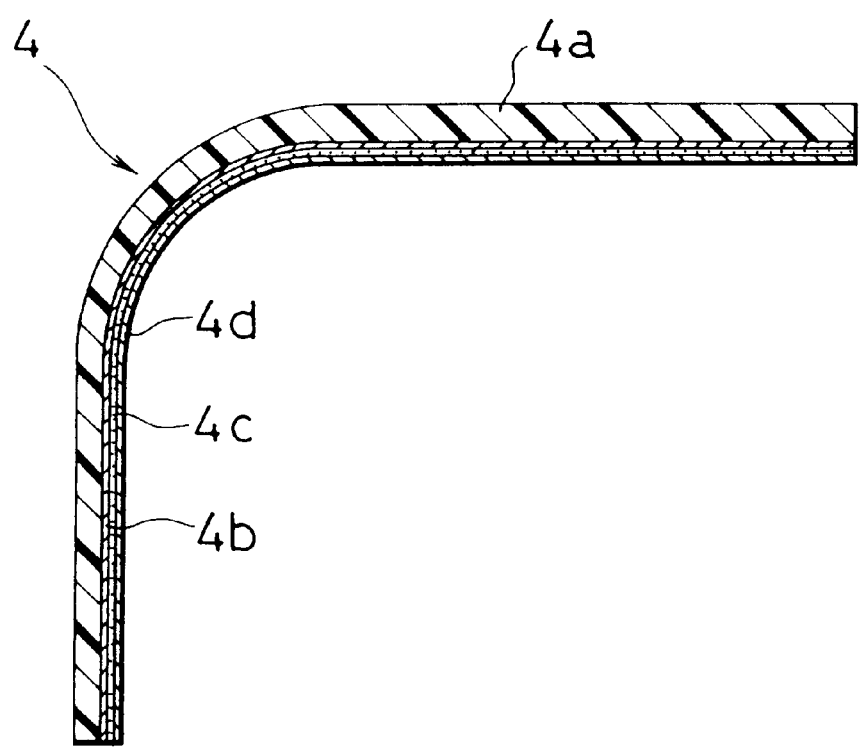
FIG. 5 is a sectional view showing a construction of an ornamental frame of the cabinet, taken along the line A—A of FIG. 2.

In this embodiment of the present invention, the ornamental frame 4 located at the forefront of the cabinet 1 is formed by the method of the present invention. The ornamental frame 4 is made in a frame structure consisting of a front face portion 5 and a surrounding frame portion 6. FIG. 5 shows a section of the ornamental frame 4, and the ornamental frame 4 includes a frame body 4a which is manufactured through the molding of a hard transparent plastic or resin material. An adhesive layer 4b is formed on approximately entire inner or rear face of the frame body 4a. Before the adhesive layer 4b dries up, foil-like metallic fine particles or fragments 4c having lustrous are applied on the adhesive layer 4b. While the metallic fine particles 4c are shown as a layer in FIG. 5, this is only for giving a graphic representation. Practically, the metallic fine particles 4c are dispersedly applied over the adhesive layer 4b with appropriate spaces therebetween. The metallic fine particle is not limited to the foil-like particle, and any forms of particles, such as metallic powder, may be used. A coated layer 4d is formed on the adhesive layer 4b on which the metallic fine particles 4c are applied. This coated layer 4d may be formed by ordinary coating or painting techniques. It is desirable to coat with a paint having a color which allows the color tone of the coated layer to be observed and allows the color or lustrous of the metallic fine particles to be enhanced or stood out, when observed from the front face of the frame body 4a formed by the transparent plastic material. It is also possible to apply the metallic coating.

For the transparent plastic material to form the frame body 4a, it is desirable to use either polycarbonate resin or methacryl resin, but any transparent, hard plastic material may be applied. For the adhesive, any adhesives which can be generally used to plastic materials may be applied. The adhesive layer may be formed by ordinary methods, such as brushing, coating or spraying. The application of the metallic fine particles is required to perform before the adhesive layer 4b dries up. It is also an effective approach to use pigment of fine particles or paper fragments as a substitute for the metallic fine particles.

Figure 6A:
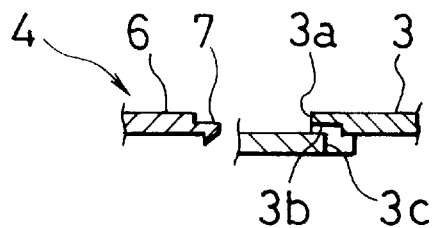
FIG. 6 is a partial sectional view showing a structure for attaching an ornamental frame to a mounting frame, wherein FIG. 6 (*a*) shows a state before engaging, and FIG. 6 (*b*) shows an engaged state.
Figure 6B:
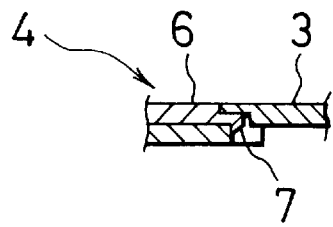
Figure 7:
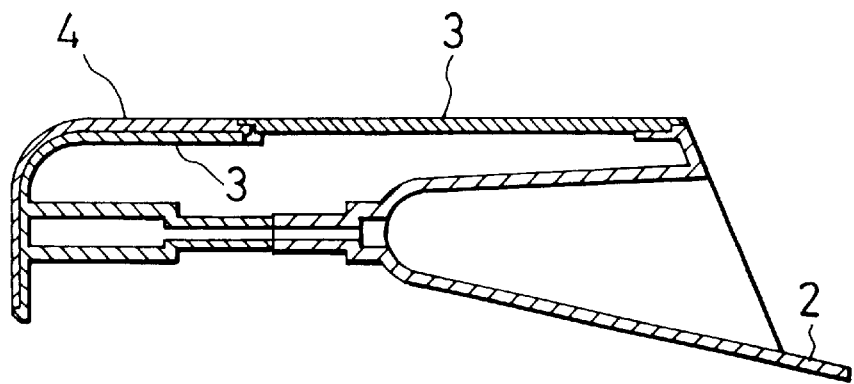
FIG. 7 is a sectional view showing an assembled state of the cabinet, taken along the line B—B of FIG. 1.

When observed from the front face of the ornamental frame 4 formed by the above method, the surface of the ornamental frame 4 has a transparency with lustrous and presents an ornamental appearance such that the fine particles of metal or the like are scattered as stars in the night sky over the color tone of the coated layer. This ornamental frame 4 is attached to the front face of the mounting frame 3 of the cabinet 1. For attaching the ornamental frame 4, the mounting tab 7 is formed at the rear end of the surrounding frame portion 6 of the ornamental frame 4. As shown in FIG. 4, a step portion 3a is formed in the mounting frame 3 in order to receive the ornamental frame 4, and a tab receiving groove 3b is formed at an adequate location of the step portion 3a. FIGS. 6 (a) and (b) show an engaging relationship between the tab receiving groove 3b and the tab 7. As shown in these figures, the tab formed in the surrounding frame portion 6 of the ornamental frame 4 is inserted into the tab receiving groove 3b formed in the step portion 3a of the mounting frame 3. Then, the tab 7 is engaged with an engagement end 3c formed inside of the tab receiving groove 3b. FIG. 6(a) and FIG. 6(b) show the state before engaging and the engaged state, respectively. FIG. 7 is a sectional view showing the cabinet 1 in the assembled state.

Figure 8:
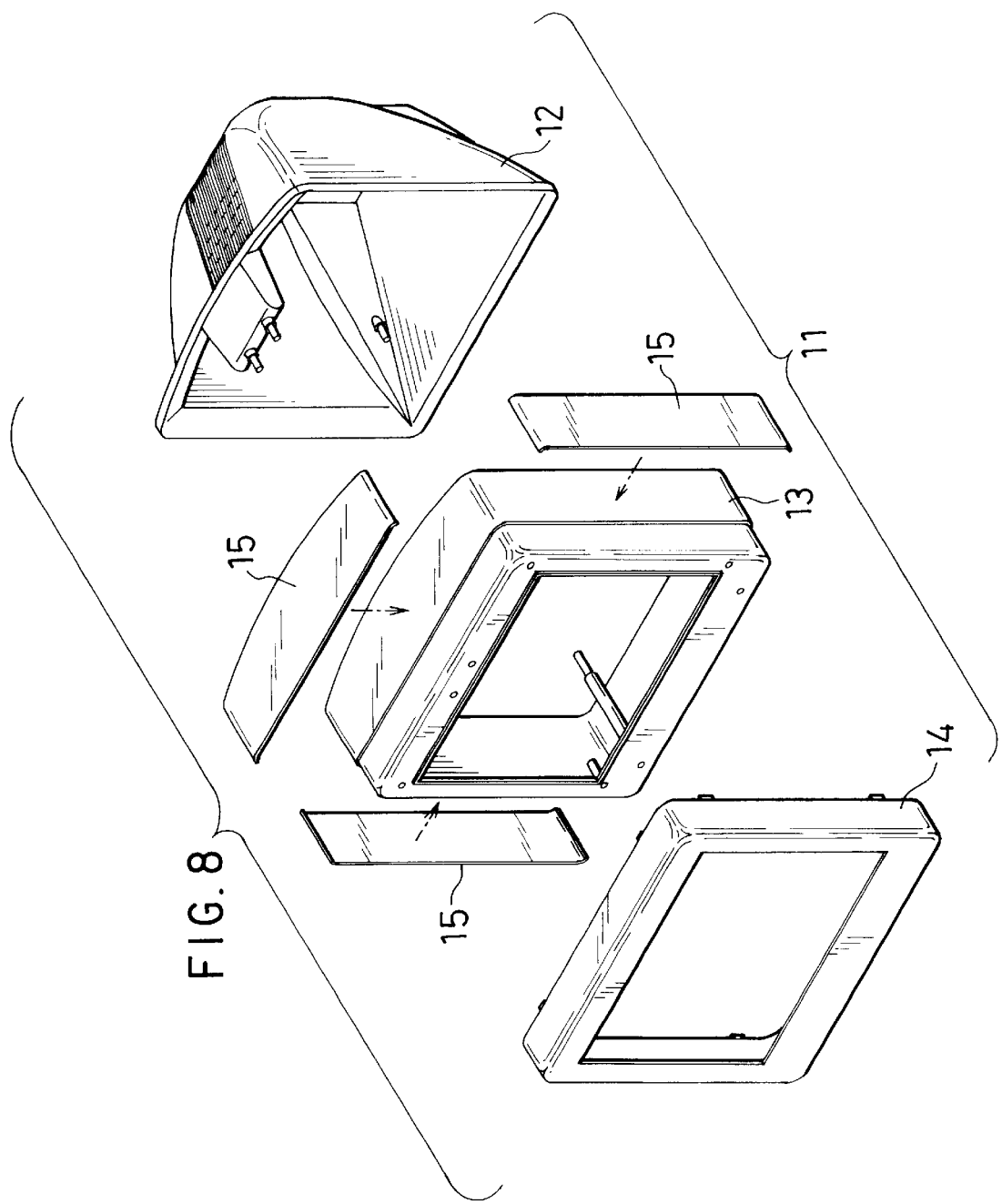
FIG. 8 is a front exploded perspective view showing a personal computer cabinet according to another embodiment of the present invention.

FIG. 8 shows another embodiment of the present invention. In this embodiment, a cabinet 11 comprises a cabinet body 12, a mounting frame 13 and an ornamental frame 14 attached on the front face of the cabinet 11, just as seen in the aforementioned embodiment. The construction of the ornamental frame 14 is also same as in the aforementioned embodiment. In this embodiment, each ornamental panel 15 is attached to both side faces and the upper face of the mounting frame 13. As with the ornamental frame 4 described in connection with the aforementioned embodiment, the ornamental panel 15 includes a body formed of a transparent hard plastic material and an adhesive layer formed on the rear face of the body, and metallic foil particles or other kinds of fine particles are dispersedly applied on the adhesive layer before the adhesive layer dries up. Then, the adhesive layer applied with the metallic foil or other kinds of fine particles is coated with paint thereover. The ornamental panel 15 may be attached on the mounting frame 13 with adhesives.

Figure 9:
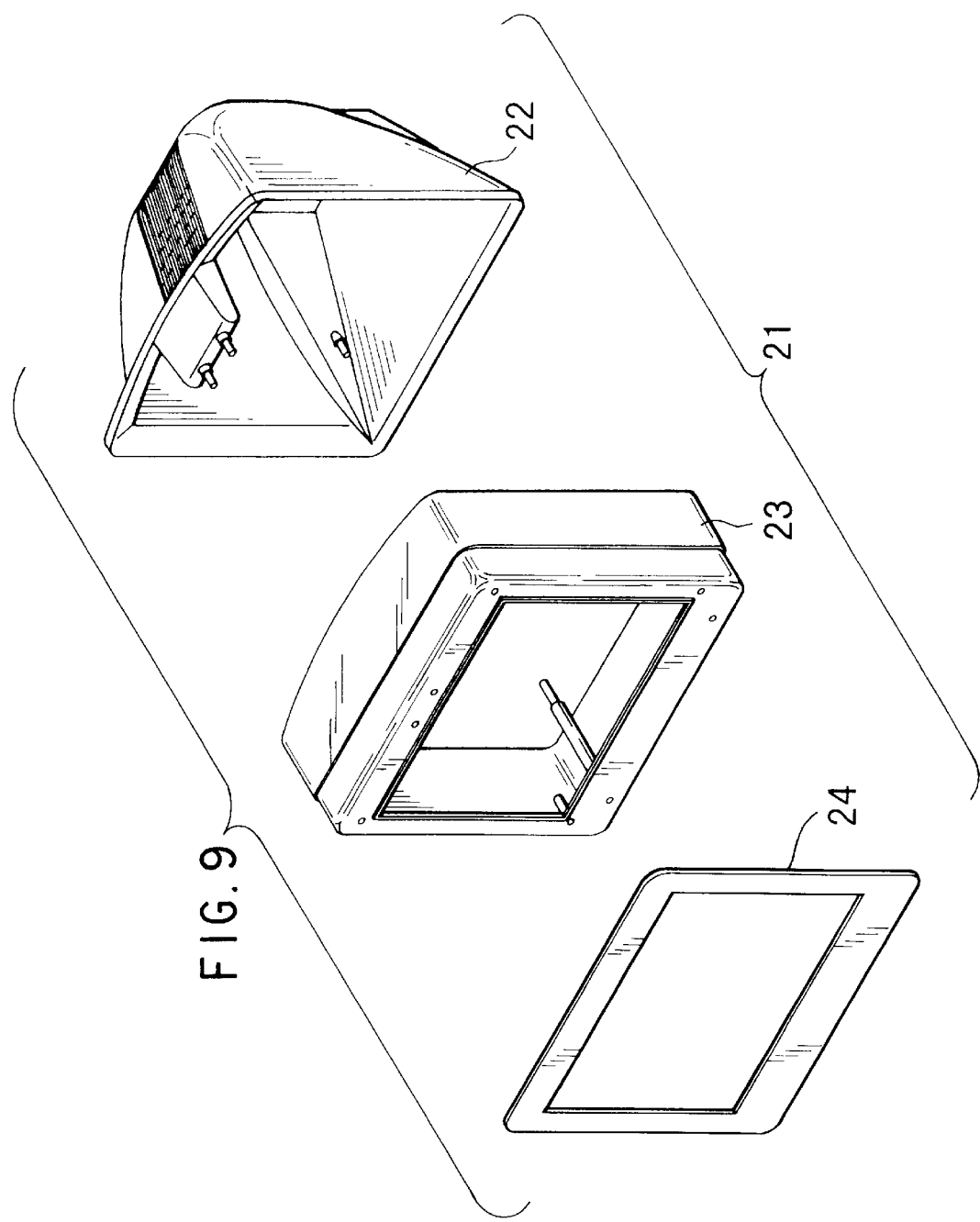
FIG. 9 is a front exploded perspective view showing a personal computer cabinet according to still another embodiment of the present invention.

FIG. 9 shows still another embodiment of the present invention. In this embodiment, a cabinet 21 comprises a cabinet body 22, a mounting frame 23, and an ornamental panel 24 on the front face of the cabinet 21. The ornamental panel 24 is shaped to cover four sides of the front face of the mounting frame 23. As with the ornamental frames 4, 14 and ornamental panel 15 described in connection with the aforementioned embodiments, the ornamental panel 24 includes a body formed of a transparent hard plastic material and an adhesive layer formed on the rear face of the body, and metallic foil particles or other kinds of fine particles are dispersedly applied on the adhesive layer before the adhesive layer dries up. Then, the adhesive layer applied with the metallic foil particles or other kinds of fine particles is coated with paint thereover. The ornamental panel 24 may be attached on the mounting frame 23 with adhesives.

The present invention is applicable not only to cabinets of televisions or personal computers, but also to various ornamental panels. For instance, the ornamental panel of the present invention may be applied to a body of a telephone. Portable phones are one of product suitable for applying the present invention. The present invention may also be applied to picture or photo frames.

Figure 10:
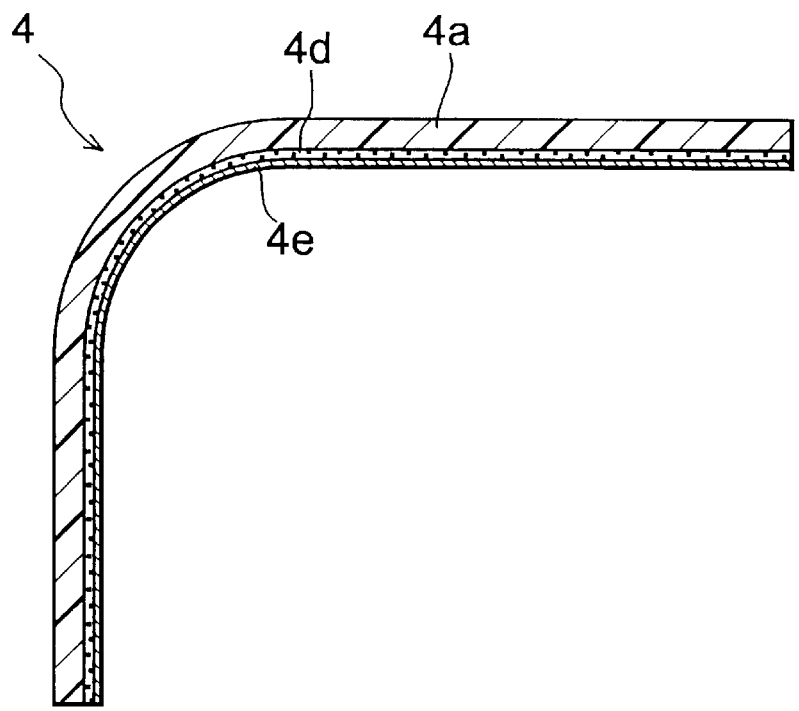
FIG. 10 is a sectional view in the same form as FIG. 5, showing an ornamental frame according to yet another embodiment of the present invention.

FIG. 10 is a sectional view corresponding to FIG. 5, showing yet another embodiment of the present invention. A method according to this embodiment may provide a more simplified process than that in the method according to the aforementioned embodiments, so that manufacturing costs may be reduced. In this embodiment, a frame body 4a of an ornamental frame 4 is formed of a transparent plastic material, as with each method in the aforementioned embodiments. Then, the rear face of the frame body 4a is coated with a transparent paint having metallic foil particles or other kinds of fine particles mixed therewith so as to form an intermediate coated layer 4d. The intermediate coated layer 4d is further coated with a paint having a desired color so as to form a coated layer 4e thereover. This embodiment allows the painting process to be completed by two steps so that manufacturing costs may be reduced. In addition, an ornamental aesthetic appearance may be yielded as with the ornamental panels in the aforementioned embodiments.

Figure 11:
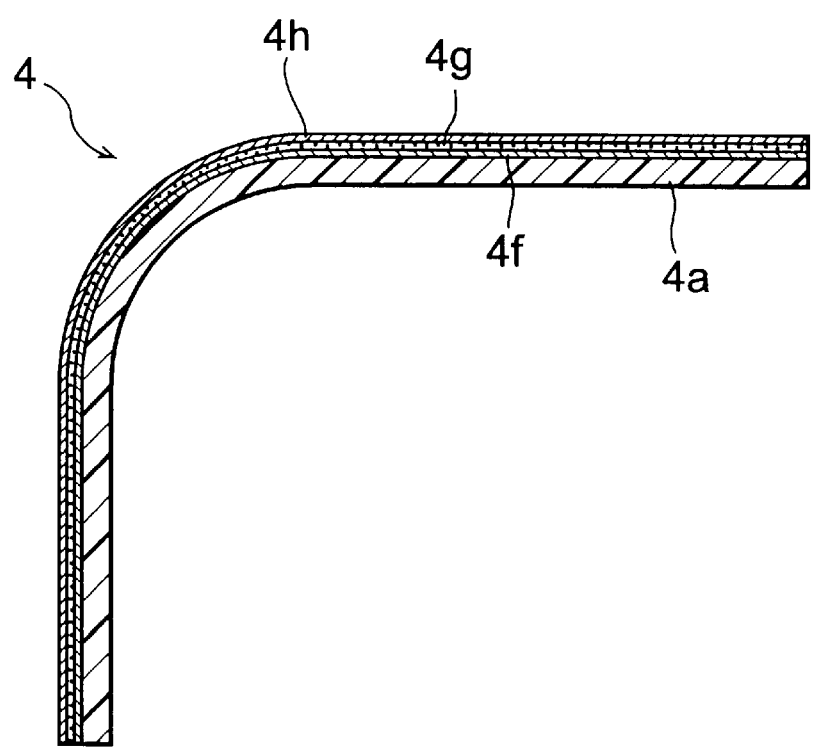
FIG. 11 is a sectional view in the same form as FIG. 5, showing an ornamental frame according to still a further embodiment of the present invention.

FIG. 11 is a sectional view corresponding to FIGS. 5 and 10, showing still a further embodiment of the present invention. In this embodiment, it is unnecessary for the frame body 4a to be formed of a transparent material. A coated layer 4f having a desired tone is provided on the frame body 4a formed of a plastic material. Then, metallic foil particles 4g or other kinds of fine particles are dispersedly applied on the coated layer 4f having a desired tone before the coated layer 4f dries up. The metallic foil particles or other kinds of fine particles are then coated with a transparent paint thereover so as to form an overcoated layer 4h. In this embodiment, a lustrous appearance is yielded by the overcoated layer 4h, and an ornamental appearance is also yielded by allowing the metallic foil particles 4g or other kinds of fine particles and the coated layer 4f having a desired tone to be observed through the overcoated layer 4h.

What is claimed is:

1. A method for manufacturing an ornamental part, comprising the steps of:

forming a part of an electronic apparatus defining an opening for one of a television and computer monitor having interior and exterior surfaces formed of a transparent resin material;

applying a liquid adhesive on said interior surface of said part;

applying colored or lustrous particles onto said adhesive; and coating the colored or lustrous particles with paint so that the colored or lustrous particles are seen at the exterior surface through the transparent resin material.

2. A method for manufacturing an ornamental part, comprising the steps of:

forming a part of an electronic apparatus defining an opening for one of a television and computer monitor having interior and exterior surfaces formed of a transparent resin material;

coating sail interior surface of said part with a transparent paint having colored or lustrous particles mixed therewith; and coating the interior surface with a paint having a color over the transparent paint so that the colored or lustrous particles are seen at the exterior surface through the transparent resin material.

3. A method for manufacturing an exterior part of electronics apparatuses having a lustrous appearance of an exterior surface of the exterior part, said method comprising the steps of:

forming said exterior part of a transparent resin material;

applying a liquid adhesive on an interior surface of said formed exterior part;

applying colored particles onto said adhesive; and coating the colored particles with paint so that the colored particles are seen at the exterior surface through the transparent resin material.

4. A method for manufacturing an exterior part of electronics apparatus having a lustrous appearance of an exterior surface of the exterior part, said method comprising the steps of:

forming said exterior part of a transparent resin material;

coating an interior surface of said formed exterior part with a transparent paint having colored or lustrous particles mixed therewith; and coating the colored or lustrous particles with a paint having a color so that the colored or lustrous particles are seen at the exterior surface through the transparent resin material.

* * * * *